(12) United States Patent
Lancini et al.

(10) Patent No.: US 11,446,914 B2
(45) Date of Patent: Sep. 20, 2022

(54) PROCESS FOR THERMO-ADHESIVE BONDING OF SEMI-FINISHED PRODUCTS

(71) Applicant: MACPI S.P.A. PRESSING DIVISION, Palazzolo sull'Oglio (IT)

(72) Inventors: Paolo Lancini, Palazzolo sull'Oglio (IT); Giovanni Cartabbia, Palazzolo sull'Oglio (IT)

(73) Assignee: MACPI S.P.A. PRESSING DIVISION, Palazzolo sull'Oglio (IT)

( * ) Notice: Subject to any disclaimer, the term of this patent is extended or adjusted under 35 U.S.C. 154(b) by 0 days.

(21) Appl. No.: 17/154,124

(22) Filed: Jan. 21, 2021

(65) Prior Publication Data

US 2021/0221115 A1  Jul. 22, 2021

(30) Foreign Application Priority Data

Jan. 22, 2020 (IT) ........................ 102020000001162

(51) Int. Cl.
*B32B 37/12* (2006.01)
*A41B 11/00* (2006.01)
(Continued)

(52) U.S. Cl.
CPC ........ *B32B 37/1207* (2013.01); *A41B 11/005* (2013.01); *B32B 7/12* (2013.01);
(Continued)

(58) Field of Classification Search
CPC ....... B32B 37/1207; B32B 7/12; B32B 27/12; B32B 27/40; B32B 37/10; B32B 37/18; B32B 2250/03; B32B 2250/40; B32B 2307/724; B32B 2307/7265; B32B 2437/00; A41B 11/005
See application file for complete search history.

(56) References Cited

U.S. PATENT DOCUMENTS

2016/0021979 A1 * 1/2016 Iuchi ........................ D04B 1/16
  36/45
2017/0129200 A1 * 5/2017 Adami ................... A43D 95/14

FOREIGN PATENT DOCUMENTS

WO  WO-2016115156 A1 *  7/2016  ........... B29D 35/122
WO  2019180603 A1  9/2019

OTHER PUBLICATIONS

Search Report and Written Opinion issued in Italian Application No. IT202000001162, dated Jun. 25, 2020.

* cited by examiner

*Primary Examiner* — Vishal I Patel
(74) *Attorney, Agent, or Firm* — Jones Robb, PLLC (57) ABSTRACT

A process for thermo-adhesive bonding of semi-finished products includes preparing an inner sock, an outer sock and an impermeable membrane provided with a thermo-adhesive disposed on an inner surface and/or an outer surface of the membrane; fitting the inner sock onto a rigid reference shape; fitting the membrane over the inner sock; fitting the outer sock over the membrane; heating the outer sock, the membrane and the inner sock arranged on the rigid reference shape in an oven until at least partial melting of the thermo-adhesive; cooling the outer sock, the membrane and the inner sock arranged on the rigid reference shape until cross-linking of the thermo-adhesive and stable bonding of the membrane to the outer sock and/or the inner sock. Also, exerting a substantially uniform pressure on the outer sock, the membrane and the inner sock disposed on the rigid reference shape during cooling, so as to compact them.

17 Claims, 8 Drawing Sheets

(51) Int. Cl.
*B32B 7/12* (2006.01)
*B32B 27/12* (2006.01)
*B32B 27/40* (2006.01)
*B32B 37/10* (2006.01)
*B32B 37/18* (2006.01)

(52) U.S. Cl.
CPC .............. *B32B 27/12* (2013.01); *B32B 27/40* (2013.01); *B32B 37/10* (2013.01); *B32B 37/18* (2013.01); *B32B 2250/03* (2013.01); *B32B 2250/40* (2013.01); *B32B 2307/724* (2013.01); *B32B 2307/7265* (2013.01); *B32B 2437/00* (2013.01)

FIG.13 ion No. 102020000001162, filed on Jan. 22, 2020, the entire
PROCESS FOR THERMO-ADHESIVE BONDING OF SEMI-FINISHED PRODUCTS

CROSS-REFERENCE TO RELATED APPLICATIONS

This application claims priority to Italian Patent Application No. 102020000001162, filed on Jan. 22, 2020, the entire content of which is incorporated by reference herein.

FIELD OF THE FINDING

The present invention relates to a process for thermo-adhesive bonding (and possible thermo-forming) of semi-finished products for the production of multi-layered articles/accessories. Preferably but not exclusively, the present invention is applicable in the context of footwear manufacturing.

Definitions

In the present description and appended claims, the term "semi-finished product" means an item formed from threads and/or fibers of the woven or non-woven type or a sheet or film otherwise obtained. A nonwoven fabric is a product similar to a fabric but obtained by processes other than weaving. The semi-finished product is shaped like a sock in the sense that it is suitable to be worn on a rigid form. For example, but not exclusively, the semi-finished product has a substantially tubular shape with one end open and the other closed (like a bag) or both open. However, the sock may also present a more complex shape, for example that of a glove.

The articles/accessories that can be manufactured through the present invention include, by way of non-limiting example, articles of clothing or parts thereof (for example, gloves, socks, elements for jackets, pants, etc.) including technical/sports articles, medical articles (containment or orthopedic braces), accessories (bags, backpacks, trolleys, suitcases, etc.), coverings of various kinds, for example for furnishings or vehicles, and footwear of various kinds (including sports or orthopedic).

In the present description and appended claims, the term "thermo-plastic or thermo-adhesive element" means an element comprising thermoplastic polymers, i.e. polymers formed by linear or loosely branched chains which are not linked to each other. It is therefore sufficient to increase the temperature to bring them to a viscous state and thus be able to shape them. Thermo-plastic or thermos-adhesive elements have the ability to modify their structure at a given temperature (usually between 60° C. and 180° C.), and then to melt once reached this temperature and to cross-link once cooled. Examples of "thermo-plastic or thermo-adhesive" elements are yarns, layers, drops of thermo-plastic or thermo-adhesive material.

In this description and appended claims, the term "reference shape or rigid envelope" means an element that substantially does not deform under the action of the difference in pressures used in the process between exterior and interior.

BACKGROUND OF THE FINDING

For instance, in this context, document US2017/129200 (Nike Inc.) is known which discloses the thermoforming of clothing articles, such as footwear, from textile artifacts. Specifically, US2017/129200 describes thermoforming performed using a bag in which a vacuum is made to apply pressure to an article comprising thermoplastic material while it is heated in a heating station and then cooled in a cooling station. The bag with the artifact is hung as it is transported. The cooling station comprises an air blade or cooled chamber employing a refrigerant.

Public document WO2019180603, on behalf of the same Applicant, discloses a method for three-dimensional forming of an upper of a shoe, comprising: preparing a sock comprising thermos-plastic yarns; fitting the sock on a reference shape of an upper to be formed; arranging the reference shape with the sock in an oven; heating the sock in the oven until at least partial melting of thermos-plastic material of the thermos-plastic yarns of the sock is determined; cooling the sock until cross-linking of the thermos-plastic material and formation of the upper with stiffer portions and less rigid portions is determined; removing the upper from the reference shape. In an embodiment illustrated in WO2019180603, it is contemplated to dispose a waterproof membrane between an outer sock and an inner sock of a semi-finished product then subjected to heating in an oven and subsequently cooled in a cooling chamber.

The Applicant noted that known type processes and apparatuses, such as those described above, are improvable in several respects.

In particular, the Applicant has observed that the processes and apparatuses of known type for thermo-forming and/or bonding by thermo-adhesion of semi-finished products are not capable of producing high quality products due to the manner in which the heating and stabilization of the portions equipped with the thermo-plastic and/or thermo-adhesive materials are performed.

Specifically, the Applicant noted that the use of disposable bags during heating, as illustrated in US2017/129200, does not allow the thermo-plastic or thermo-adhesive elements to be brought to the desired temperature and made viscous effectively and quickly.

The Applicant also noted that the use of disposable bags during heating is a waste of material.

The Applicant also noted that compression during heating is of little use in stabilizing the portions equipped with the thermo-plastic and/or thermo-adhesive materials.

The Applicant also noted that known cooling devices are ineffective and energy inefficient.

The Applicant also noted that known cooling devices that employ refrigerants are complex, expensive and cumbersome.

The Applicant also noted that the processes and apparatuses of known type for thermo-forming and/or bonding by thermo-adhesion of semi-finished products are not capable of producing high quality manufactured goods, also due to the manner in which the cooling and stabilization of the portions equipped with the thermo-plastic and/or thermo-adhesive materials is performed.

In particular, the Applicant noted that known processes and apparatuses do not allow for the production of quality articles/accessories that include an inner layer, outer layer and an intermediate membrane.

In particular, the Applicant noted that the known processes and apparatuses do not allow for such items/accessories to be manufactured relatively easily and quickly.

SUMMARY

In this context, the Applicant has therefore set itself the objective of proposing a process for thermo-adhesive bonding of said semi-finished products that is able to overcome the above-mentioned drawbacks.

In particular, the Applicant has set itself the objective of proposing a process for thermo-adhesive bonding of said semi-finished products that allows the stable and precise joining of said semi-finished products.

The Applicant also set out to propose a process to produce quality multi-layer items/accessories.

In particular, the Applicant has set itself the goal of making multi-layered articles/accessories with an intermediate membrane that are stable in use and durable.

The Applicant also set out to propose a process for thermo-adhesive bonding of semi-finished products that is relatively simple, effective, efficient and economical.

The Applicant has found that the above purposes and others can be substantially achieved by cooling the multi-layered assembly provided with adhesive and previously heated while said assembly is compacted on the rigid shape onto which it is fitted.

In particular, Applicant has found that the above listed purposes and others can be substantially achieved by a process according to one or more of the appended claims and/or one or more of the following aspects.

According to an independent aspect, the present invention relates to a process for thermo-adhesive bonding of semi-finished products.

The Process Comprises:
preparing at least one inner sock;
preparing at least one outer sock;
preparing at least one membrane with a thermo-adhesive placed on an inner surface and/or an outer surface of said membrane;
fitting the inner sock on a rigid reference shape;
fitting the membrane over the rigid reference shape and over the inner sock;
fitting the outer sock over the rigid reference shape and over the membrane;
heating the outer sock, the membrane and the inner sock arranged on the rigid reference shape until at least partial melting of the thermo-adhesive is determined;
cooling the outer sock, the membrane and the inner sock placed on the rigid reference shape until the thermo-adhesive is cross-linked and the membrane is firmly bonded to the outer sock and/or inner sock;
wherein, during cooling, it is further contemplated to exert substantially uniform pressure on the outer sock, on the membrane and on the inner sock disposed on the rigid reference shape to compact said outer sock, membrane and inner sock.

The Applicant has first verified that the process according to the present invention enables the membrane to be precisely and stably joined to the inner sock and/or the outer sock, thereby obtaining a quality multi-layered semi-finished product.

The Applicant has also verified that the process according to the present invention is relatively simple and fast.

Additional aspects of the present invention are set forth below.

In one aspect, the membrane is impermeable, preferably to water.

In one aspect, the membrane is elastic.

Thus, the Applicant has verified that the process according to the present invention enables the waterproofing of a multilayered article/accessory and the obtaining of a stable, durable and quality waterproofed multilayered article/accessory.

In one aspect, the membrane is breathable.
In one aspect, the membrane is polyurethane.

In one aspect, the membrane is made of polytetrafluoroethylene (PTFE).

In one aspect, the membrane has an outline similar to that of the inner sock and/or the outer sock.

In one aspect, the thermo-adhesive is placed only on part of the inner surface and/or the outer surface of the membrane.

In one aspect, the thermo-adhesive is arranged in dots on the membrane.

In one aspect, the inner sock and/or the outer sock are made of a knitted fabric.

In one aspect, the inner sock and/or the outer sock are made on a weaving loom, preferably circular.

In one aspect, the inner sock and/or the outer sock comprise/s at least one thermo-plastic yarn, optionally a plurality of thermo-plastic yarns.

In one aspect, heating and cooling the outer sock, the membrane and the inner sock disposed on the rigid reference shape result in at least partial melting and subsequent cross-linking of the thermo-plastic yarn(s) and formation of more rigid portions and less rigid portions of the inner sock and/or outer sock.

In one aspect, exerting a pressure comprises: placing the outer sock, the membrane and the inner sock arranged on the rigid reference shape in a flexible bag and generating a pressure difference between the outside and inside of the bag so as to compress said bag against the outer sock, the membrane and the inner sock.

In one aspect, the outer sock, the membrane and the inner sock arranged on the rigid reference shape are placed in the flexible bag only after heating.

In one aspect, heating is carried out without any bag placed around the outer sock, the membrane and the inner sock placed on the rigid reference shape while cooling and application of pressure are carried out while the outer sock, the membrane and the inner sock placed on the rigid reference shape are placed in the flexible bag.

In one aspect, the substantially uniform pressure exerted during cooling on the outer sock, the membrane, and the inner sock arranged on the rigid reference shape is between 0.5 Kg/cm$^2$ and 2 Kg/cm$^2$.

In one aspect, heating is performed in an oven.

In one aspect, heating in an oven the outer sock, the membrane and the inner sock arranged on the rigid reference shape comprises: circulating a heated fluid in the oven, wherein the heated fluid comes into direct contact with at least the outer sock.

In one aspect, the heated fluid comprises water steam.

In one aspect, the heated fluid comprises overheated air, steam, preferably overheated, or a mixture of overheated air and steam, preferably overheated.

In one aspect, a percentage of overheated air in the mixture of overheated air and steam, preferably overheated steam, is between 10% and 70%.

In one aspect, an overheated air temperature is between 50° C. and 300° C.

In one aspect, an overheated steam temperature is between 150° C. and 200° C.

The Applicant has verified that the qualitatively best results and the shortest heating time in the oven can be achieved by the mixture of overheated air and steam preferably overheated. Steam at 100° C., or preferably steam already overheated at 150° C. and 200° C., for example, and air overheated at 50° C. to 300° C., for example, lead to the formation of overheated steam. This mixture maximizes the heat exchange with the socks and the membrane, optimizes the temperature uniformity on the socks, on the membrane and on the thermos-adhesive and on any thermos-plastic yarns and further avoids condensation problems in the oven.

In one aspect, cooling comprises: placing the outer sock, the membrane and the inner sock arranged on the rigid reference shape in an auxiliary casing which is in turn placed in a rigid casing.

In one aspect, the auxiliary casing is impermeable to gases.

In one aspect, a first volume is delimited between the rigid casing and the auxiliary casing.

In one aspect, a second volume is delimited within the auxiliary casing.

In one aspect, cooling comprises: introducing a gas at a first pressure through an inlet into the first volume and discharging said gas at a second pressure through an outlet from the first volume, wherein the second pressure is lower than the first pressure, in order to generate an expansion and cooling of the gas contained inside the first volume, cooling the auxiliary casing and the outer sock, the membrane and the inner sock arranged on the rigid reference shape.

In one aspect, the auxiliary casing is a flexible bag.

In one aspect, the process comprises: maintaining the first volume at a third pressure equal to the difference between the first pressure and the second pressure; wherein the second volume is at a fourth pressure lower than the third pressure so as to exert said substantially uniform pressure on the outer sock, the membrane and the inner sock disposed on the rigid reference shape.

In one aspect, the process comprises: closing the inlet and the outlet to maintain said third pressure in the first volume and keeping on pressing the bag against the outer sock, the membrane and the inner sock arranged on the rigid reference shape.

In one aspect, the inner sock and the outer sock are made as separate elements.

In one aspect, it is provided to make the outer sock independently of the inner sock.

In one aspect, the inner sock and/or the outer sock has an open end and an opposite closed end, wherein fitting the inner sock and/or the outer sock on the rigid reference shape comprises inserting said rigid reference shape through the open end(s).

The Applicant has verified that the use of the two separate socks allows for quick fitting on the rigid reference shape.

In one aspect, the inner sock and the outer sock are made as a single, substantially tubular element, preferably on a weaving loom, preferably circular.

In one aspect, even before fitting the inner sock on the rigid reference shape the inner sock has a closed end and an opposite end connected to the outer sock.

In one aspect, even before fitting the inner sock on the rigid reference shape the outer sock has an open end and an opposite end connected to the inner sock.

In one aspect, the outer sock and the inner sock are mutually joined already before the inner sock is fitted on the rigid reference shape.

In one aspect, fitting the outer sock on the rigid reference shape and over the membrane comprises: turning the outer sock inside out while the inner sock and the membrane are already on the rigid reference shape so as to place said outer sock over said membrane.

The Applicant has verified that the use of the single substantially tubular element described above allows, in the case of the manufacture of footwear, to obtain a shoe collar with a better finish because it is defined by the connection area of the outer sock with the inner sock.

In one aspect, the resulting multi-layered semi-finished product is, or is part of, a footwear.

In one aspect, the rigid reference shape has the outline of a shoe.

In one aspect, the outer sock defines or is configured to define an upper of the footwear.

In one aspect, the inner sock defines or is configured to define an inner lining of the footwear.

In one aspect, the inner sock and the outer sock of the single substantially tubular element are connected at an ankle or neck area of the shoe.

In one aspect, it is provided to close the open end of the outer sock after turning inside out.

In one aspect, it is provided to couple a sole to the obtained multi-layered semi-finished product.

In one aspect, the present invention also relates to a process for making a footwear comprising the process for thermo-adhesive bonding of semi-finished products according to one or more of the preceding aspects.

In one aspect, the resulting multi-layered semi-finished product is, or is part of, an article of clothing or a medical article or an accessory, such as a bag or suitcase.

In one aspect, the present invention also relates to a process for making an article of clothing or a medical article or an accessory, such as a bag or a suitcase, comprising the process for thermo-adhesive bonding of semi-finished products according to one or more of the preceding aspects.

Further features and advantages will appear more from the detailed description of a preferred, but not exclusive, embodiment of a process for thermo-adhesive bonding of semi-finished products in accordance with the present invention.

DESCRIPTION OF DRAWINGS

This description will be shown below with reference to the attached drawings, provided for indicative purposes only and, therefore, not limiting, in which.

DETAILED DESCRIPTION OF EMBODIMENTS OF THE INVENTION

Figure 1:
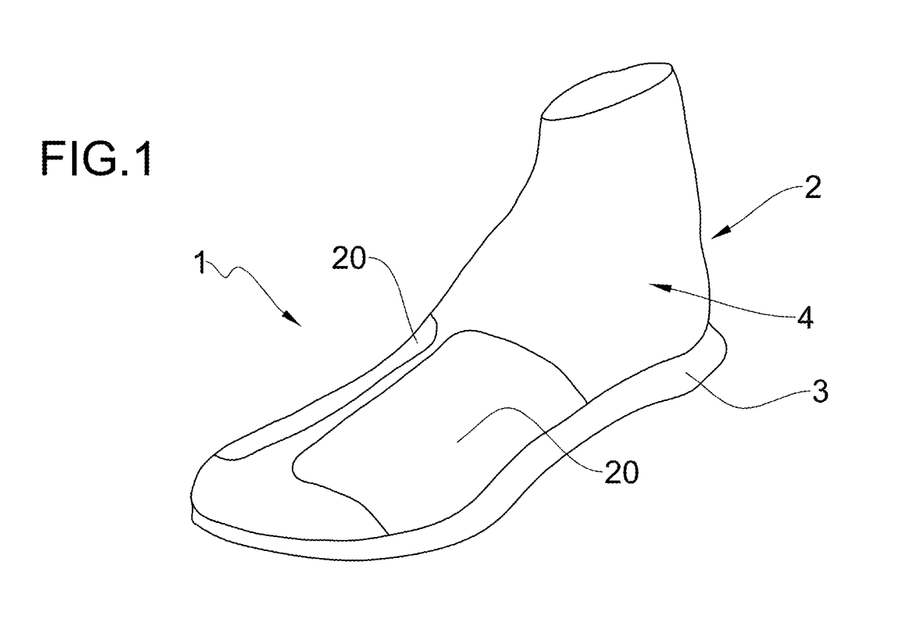
FIG. 1 illustrates a shoe made through the process according to the present invention.

With reference to FIG. 1, a footwear obtained through the process for thermo-adhesive bonding of semi-finished products according to the present invention has been overall indicated with reference numeral 1. The process according to the invention may also be used to make other articles, such as clothing articles or medical articles or accessories, such as bags or suitcases.

The footwear 1 comprises an upper 2 and a sole 3. As specified above, the upper 2 surrounds the foot and comprises both the upper portion of the footwear 1, which is more exposed and in evidence and covers the foot on the top, and also the lower portion, or insole, intended to remain hidden between the upper and the sole 3 of the footwear 1.

The upper 2 is made from a tubular element comprising an outer sock 4 and an inner sock 5 (FIGS. 3, 4 and 5) and a membrane 6 that is waterproof and breathable (shown in FIG. 5) and, for example, also elastic.

The tubular element is made by weaving, for instance by means of a circular weaving loom, which is of a type known in itself and therefore not described herein.

The tubular element comprises natural and/or synthetic yarns and can also be provided with thermo-plastic yarns, i.e. yarns made of thermoplastic polymers (thermo-melting and/or thermo-shrinking) which have the ability to change their structure at a certain temperature (usually between 60° C. and 180° C.) and therefore to melt once this temperature is reached and to cross-link once cooled. Thermo-plastic yarns may be arranged in different ways and with different densities and percentages during weaving. For example, the percentages of the thermo-plastic yarns are higher at the toe and/or heel and/or insole of the upper 2 and lower elsewhere. The arrangement and/or characteristics of the thermo-plastic yarns allow for different textures and/or stiffnesses in different areas/portions/points of the upper 2.

Figure 3:
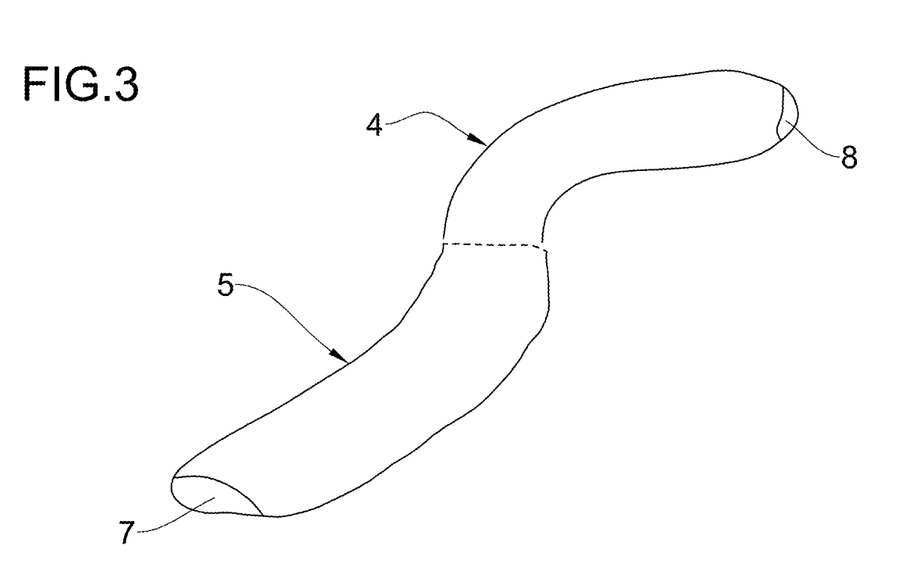
FIG. 3 shows two socks used in an embodiment of the process according to the present invention.
Figure 4:
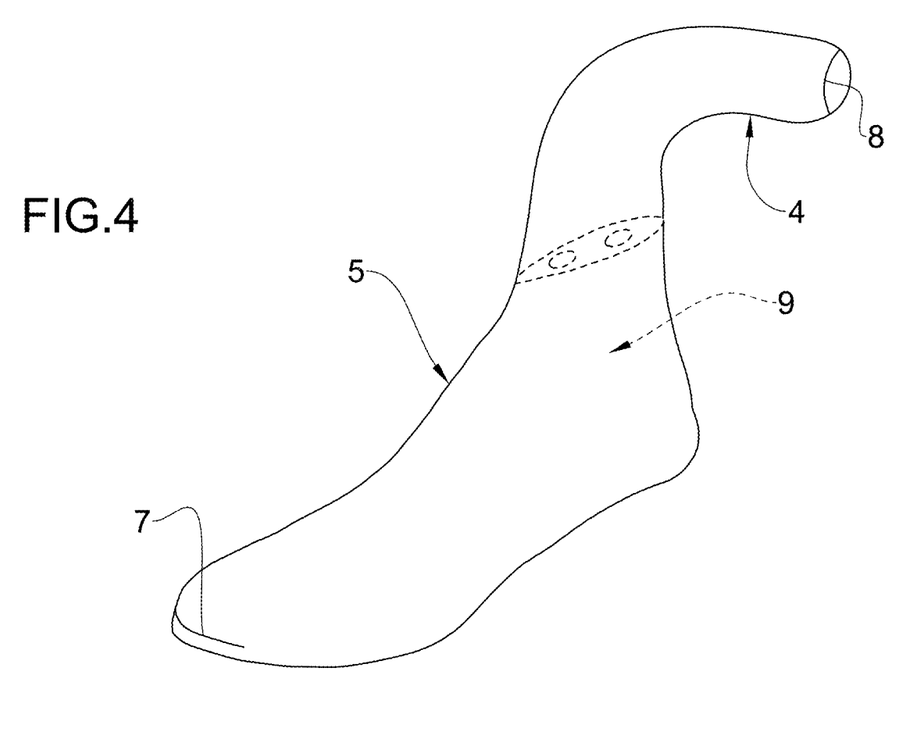
FIGS. 4, 5, 6 and 7 illustrate the rigid reference shape with the socks of FIG. 3 in respective steps of the process of the present invention.

According to the embodiment illustrated in FIGS. 3-6, the outer sock 4 and the inner sock 5 are mutually joined at, for example, an area intended to be positioned around a user's ankle (collar of the shoe). The inner sock 5 and the outer sock 4 are woven in a single weaving step. At the end of the weaving, the inner sock 5 and the outer sock 4 are mutually joined in said ankle area and consecutively arranged with respect to each other to form a single tubular body provided with two auxiliary openings 7, 8 placed at its opposite ends, as illustrated in FIG. 3.

Figure 2:
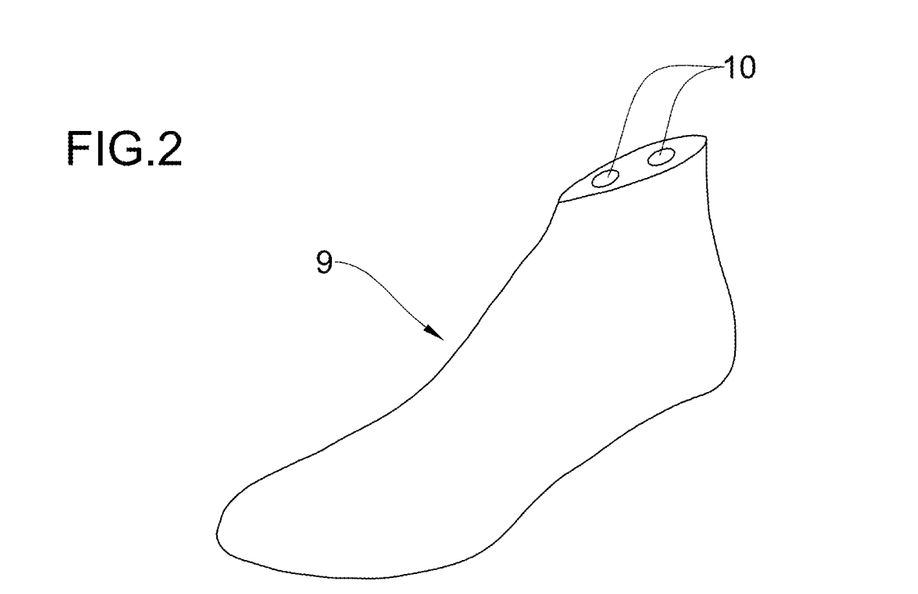
FIG. 2 illustrates a rigid reference shape employed in the process according to the present invention.

In accordance with the process of the invention, a rigid reference shape 9 (FIG. 2) is prepared which reproduces in negative the upper 2 to be formed. The rigid reference shape 9 is, for example, made of a plastic material and is such that it can withstand high temperatures and pressures of the process without being damaged and/or deformed. The rigid reference shape 9 substantially reproduces the outline of a foot and is provided, at the ankle, with anchoring elements 10 (schematically shown as holes) for engagement with a support 11, shown in FIG. 8.

In addition, the water-proof and breathable membrane 6 with a shape similar to that of the outer sock 4 is prepared. The waterproof and breathable membrane 6 is, for example, polyurethane. The membrane may also be made of other materials, such as PTFE. A thermo-adhesive is applied to an inner surface and/or an outer surface of said membrane 6, such as a plurality of thermo-adhesive droplets distributed over said surfaces. At room temperature, the thermo-adhesive droplets are solid and the membrane 6 can be manipulated.

The process involves closing, sewing or sealing the auxiliary opening 7 of the inner sock 5 and first fitting on the rigid reference shape 9 said inner sock 5 by passing the rigid reference shape 9 through the auxiliary opening 8 of the outer sock 5 until the tip of the inner sock 5 is brought at a tip of the rigid reference shape 9. The outer sock 4 is left outside the inner sock 5 and hung on said inner sock 5 (as in FIG. 4).

Figure 5:
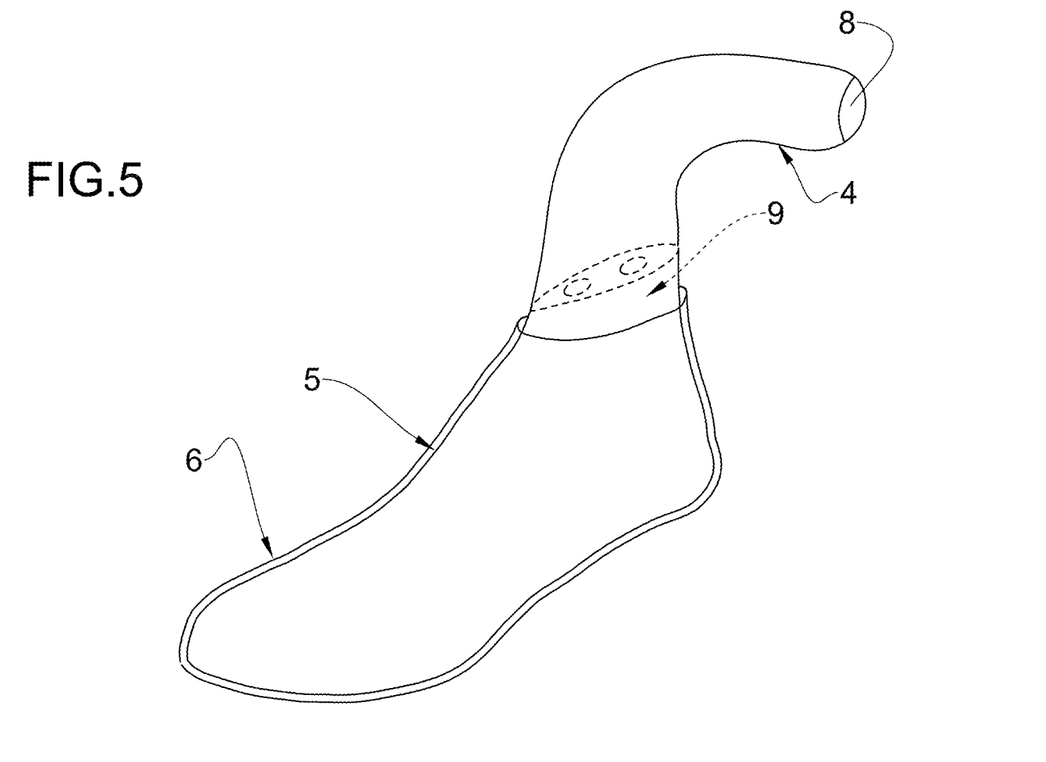
Figure 6:
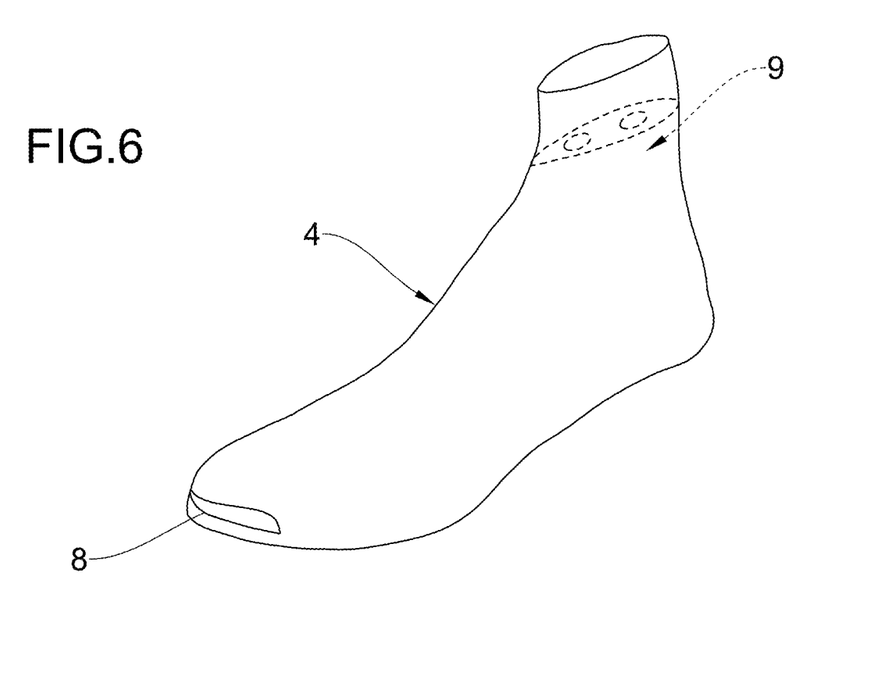

While the inner sock 5 alone is placed on the rigid reference shape 9, the water impermeable and breathable membrane 6 is fitted over the inner sock 5, as shown in FIG. 5.

At this point, the outer sock 4 is turned inside-out and also fitted over the rigid reference shape 9 and over the membrane 6 by passing the rigid reference shape 9 through the auxiliary opening 8 of the outer sock 4. In this configuration (FIG. 6), the membrane 6 is interposed between the inner sock 5 and the outer sock 4 and the thermo-adhesive in droplets (still in a solid state) lies between the inner sock 5 and the membrane 6 and/or between the membrane 6 and the outer sock 4.

Figure 7:
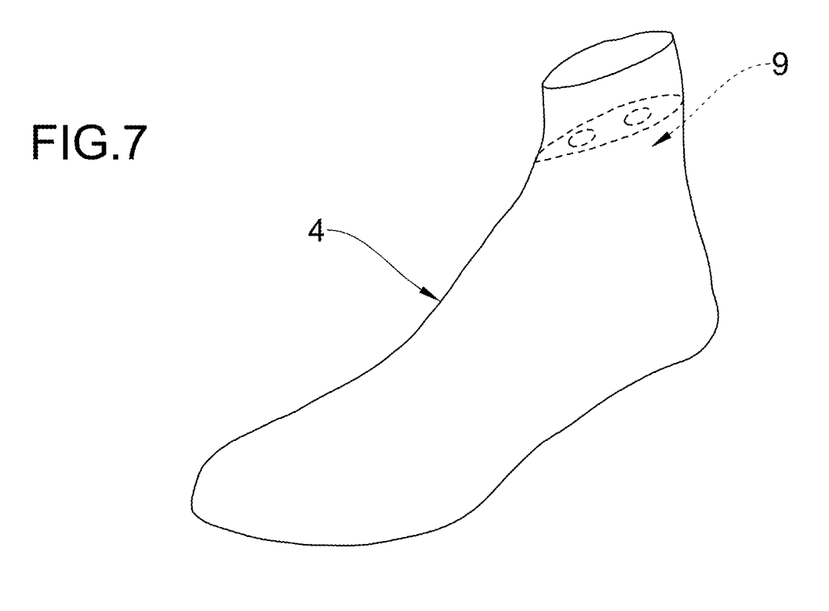

The auxiliary opening 8 of the outer sock 4 is closed (e.g. sewn or welded) and the assembly comprising the rigid reference shape 9, the inner sock 5, the membrane 6 and the outer sock 4 (illustrated in FIG. 7) is hooked to the support 11 and inserted into an oven 12. In a variant embodiment, the auxiliary opening 8 of the outer sock 4 is not closed at this stage but later, for example by application of the sole 3 after the heating and cooling described below.

Figure 8:
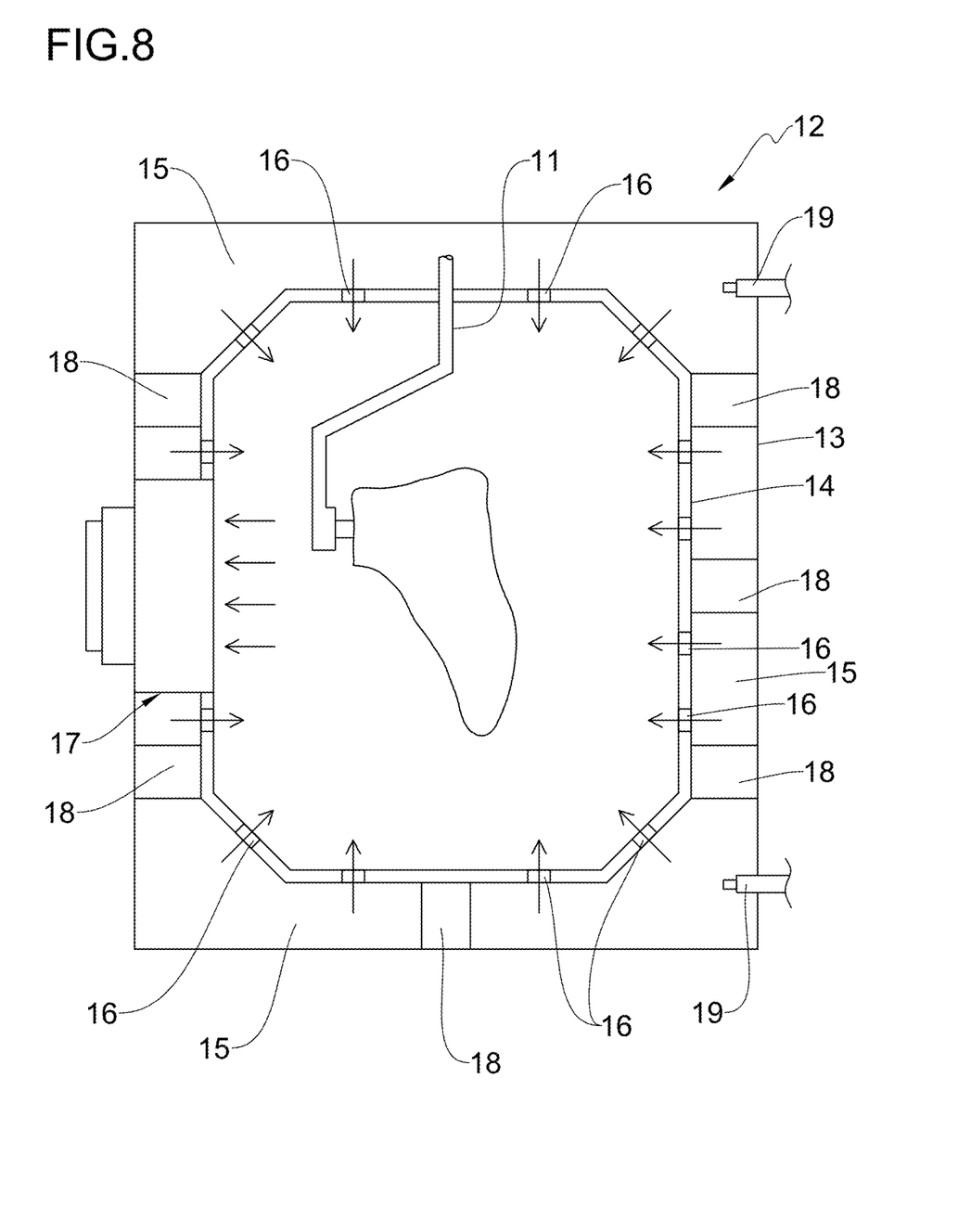
FIG. 8 illustrates the rigid reference shape with the socks placed in an oven according to a further step of the process of the present invention.

The oven 12, illustrated in FIG. 8, comprises an outer casing 13 and an inner casing 14. The inner casing 14 encloses a containment volume intended to house the assembly. The inner casing 14 and the outer casing 13 enclose a gap 15 between them. The inner casing 14 is also provided with passageways 16 that connect the gap 15 with the containment volume.

A fan 17 is mounted on the outer casing 13 and on the inner casing 14 and has a main mouth facing into the containment volume and radially peripheral outlets opening into the gap 15. The fan 17 is therefore operationally active between the containment volume and the gap 15 to determine circulation of a fluid between said containment volume and the gap 15.

Electrical heating elements 18, schematically shown in FIG. 8, are placed in the gap 15 and appropriately powered and controlled to heat the fluid circulating in the oven 12.

The oven 12 is also provided with nozzles 19 facing into the gap 15 and connected to an overheated water steam generating device, not shown, configured to feed steam into the oven 12 itself. The hot fluid that is circulated through the oven 12 and comes into direct contact with the assembly comprising the rigid reference shape 9, the inner sock 5, the membrane 6 and the outer sock 4 comprises overheated air or steam, preferably overheated, or a mixture of overheated air and steam, preferably overheated.

For instance, the percentage of overheated air in the mixture of overheated air and steam is from 10% to 70%; the temperature of overheated air is from 50° to 300° 0°; the temperature of overheated steam is from 150° to 200° C.°. In this way, the assembly (rigid reference shape 9, inner sock 5, outer sock 4, membrane 6) is brought to a temperature of 50° to 300° C.° for a time of 10 to 300 sec. Heating in the oven 12 results in at least partial melting of the thermo-adhesive droplets and any thermoplastic yarns of the inner sock 5 and/or the outer sock 4.

Figure 9:
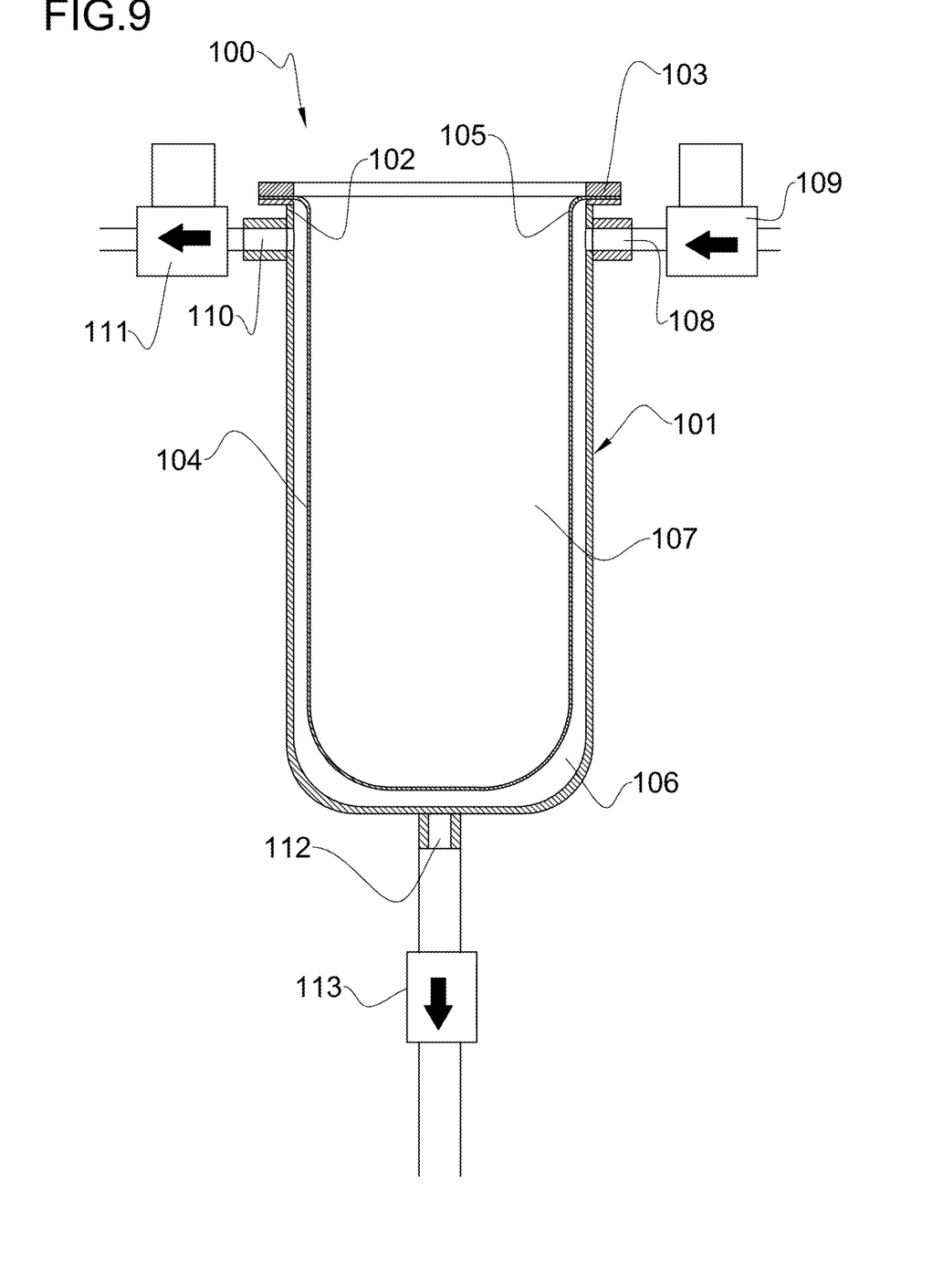
FIG. 9 illustrates a cooling device used in the process of the present invention.

Next, the assembly is removed from the oven 12 and placed in a cooling device 100 (shown in FIG. 9).

The cooling device 100 comprises a rigid casing 101, for example metallic and possibly insulated, which in the illustrated example has a substantially cup shape. The rigid casing 101 has an upper access opening 102 bounded by an edge and has a flange 103 attached to the edge. A bag 104 is disposed in the rigid casing 101. The bag 104 is closed at the bottom and has its own edge delimiting a respective opening 105. The edge of the bag 104 is interposed and secured between the flange 103 and the edge of the rigid enclosure 101. An inner surface of the rigid casing 101 and an outer surface of the bag delimit between them a first volume 106 which, during operation of the device 100, changes. The bag 104 delimits within itself a second volume 107.

The bag 104 is gas-tight, flexible and elastic, for example made of rubber. In variant embodiments, the bag 104 may also be non-elastic, for example made of plastic or a fabric that has been made impermeable, i.e. made gas impermeable. The bag 104 is configured and sized to hold the assembly comprising the rigid reference shape 9, the inner sock 5, the membrane 6 and the outer sock 4. The bag 104 is part of the device 100 and is preferably usable for a plurality of cooling cycles (i.e., preferably, it is not disposable but is only changed when broken or worn).

A lid 200 is configured to rest against the flange 103 and tight-seal the opening 105 of the bag 104 and the access opening 102. The rigid casing 101, the flange 103, the bag 104 and the lid 200 gas-tightly close the first volume 106 and the second volume 107.

The rigid casing 101 has an inlet 108 configured to allow a gas, such as air, to enter the rigid casing 101 at a first pressure P1. The inlet 108 is, for example, connected to a compressor and/or a pressurized gas tank, not shown, and comprises a pressure regulator 109 configured to regulate the inlet pressure in the rigid casing 101 and to maintain it substantially equal to said first pressure P1. The rigid casing 101 has an outlet 110 configured to allow the gas to exit at a second pressure P2 that is lower than the first pressure P1. The outlet 110 is, for example, connected to a discharge outlet, such as an ambient discharge outlet, and comprises a pressure regulator 111 configured to regulate the pressure exiting the rigid casing 101 and maintain it substantially equal to said second pressure P2.

The inlet 108 and the outlet 110 are in fluid communication with the first volume 106. The first pressure P1 at the inlet is, for example, equal to 4 bar and the second pressure P2 at the outlet is, for example, equal to 2 bar. The rigid casing 101 has an auxiliary outlet 112 disposed on a bottom of the rigid casing 101. The auxiliary outlet 112 may be closed through, for example, a valve, not shown, and is connected to a suction assembly 113, for example of the Venturi type.

An auxiliary inlet 114 (FIG. 10) is also provided through the lid 200, which, when the lid 200 is properly mounted on the flange 103, is communicating with the second volume 107, i.e. with the interior of the bag 106. The auxiliary inlet 114 is also closable via, for example, a valve, not shown. The auxiliary inlet 114 is connected to, for example, a compressor, not illustrated, to allow for the entry of pressurized gas, as will be explained later.

The lid 200 comprises a support 115 to which the rigid reference shape 9, on which the inner sock 5, the membrane 6 and the outer sock 4 are disposed, is constrained or constrainable. The support 115 is configured to be placed, together with the aforementioned assembly, in the second volume 107 when the lid 200 closes the access opening 102 (as visible in FIGS. 11 and 12).

Figure 10:
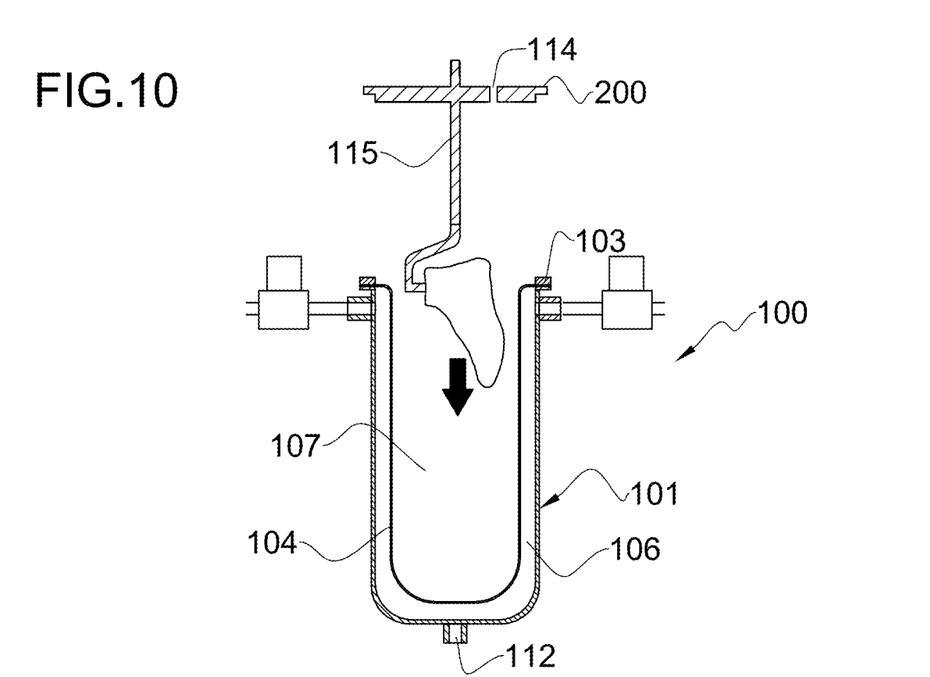
FIGS. 10 to 13 illustrate the respective operating steps implemented by the device in FIG. 9.
Figure 11:
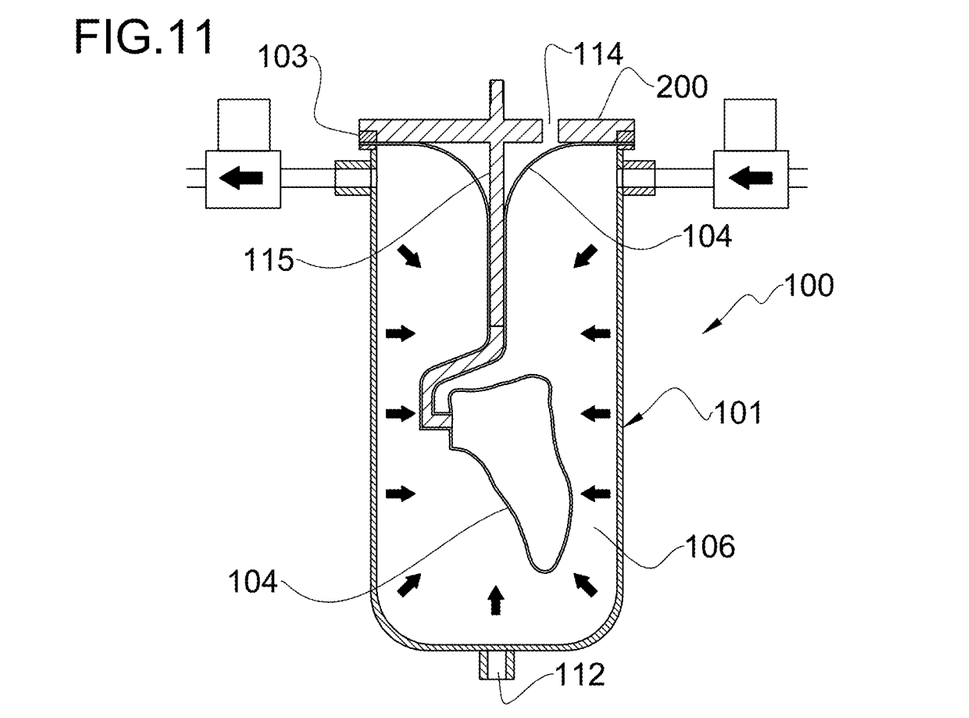

The lid 200 with the support 115 and the assembly (comprising the rigid reference shape 9, the inner sock 5, the membrane 6 and the outer sock 4) is lowered so as to insert said assembly inside the bag 104 and the rigid casing 101, as schematically illustrated in FIG. 10. The lid 200 goes and rests against the flange 103 hermetically gas-tight sealing the first volume 106 and the second volume 107 (FIG. 11).

At this stage, the pressure inside the bag 104, i.e. in the second volume 107, and also the pressure in the first volume 106 are equal to ambient pressure, i.e. about 1 bar.

At this point, suitable control devices control the inlet pressure regulator 109 and the outlet pressure regulator 111 so as to introduce air at the first pressure P1 through the inlet 108 and simultaneously discharge air at the second pressure P2, which is less than the first pressure P1, through the outlet 110. In this way, an expansion and cooling of the air contained within the first volume 106 is generated and thus a cooling of the bag 104 and of the assembly therein. For instance, the air contained within the first volume 106 is brought to a temperature of 5° C.

During this operation, the air contained in the first volume 106 is at a third pressure P3 equal to the difference between the first pressure P1 and the second pressure P2. This third pressure P3 is adjusted to be greater than the pressure inside the bag 104, i.e. of the ambient pressure, which we refer to as the fourth pressure P4. In this way, the bag 104 is pressed evenly against the outer sock 4, the membrane 6 and the inner sock 5 which in turn presses against the respective rigid reference shape 9 (which does not deform).

If the bag 104 is elastic, it adapts to the variation of the second volume 107 and adheres perfectly to the assembly without forming folds. It is also possible that the bag 104 is not elastic but is so thin that the micro-folds it forms when adhering to the assembly still ensure uniform compression of the assembly.

Possible pressure values are shown in Table 1 below.

TABLE 1

| Pressures | |
| --- | --- |
| P1 | 4 bar |
| P2 | 2 bar |
| P3 = P1 − P2 | 2 bar |
| P4 | 1 bar (Patm) |
| P3 − P4 | 1 bar |

With these values, the outer sock 4, the membrane 6 and the inner sock 5 are pressed with a pressure of about 1 Kg/cm$^2$.

For example, it may be contemplated to feed air at the first pressure P1 through the inlet 108 and discharge air at the second pressure P2 through the outlet 110 for a cooling time of 40 s. Further, it may be contemplated to close the inlet 108 and the outlet 110 to maintain said third pressure P3 in the first volume 106 and keeping on pressing the bag 104 against outer sock 4, the membrane 6 and the inner sock 5 disposed on the rigid reference shape 9, for example for a dwell time of 40 s. In addition, an air flow rate through the inlet 108 and the outlet 110 may also be adjusted to control cooling. For example, such a flow rate is between 25 L/min and 50 L/min.

Such cooling and compression cause the stable union of the waterproof and breathable membrane 6 to the inner sock 5 and/or the outer sock 4 (thermo-adhesive) and, if present, the controlled cross-linking of the thermo-plastic or thermo-adhesive yarns (thermo-forming) and the stabilization of the multilayered semi-finished product thus obtained.

Figure 12:
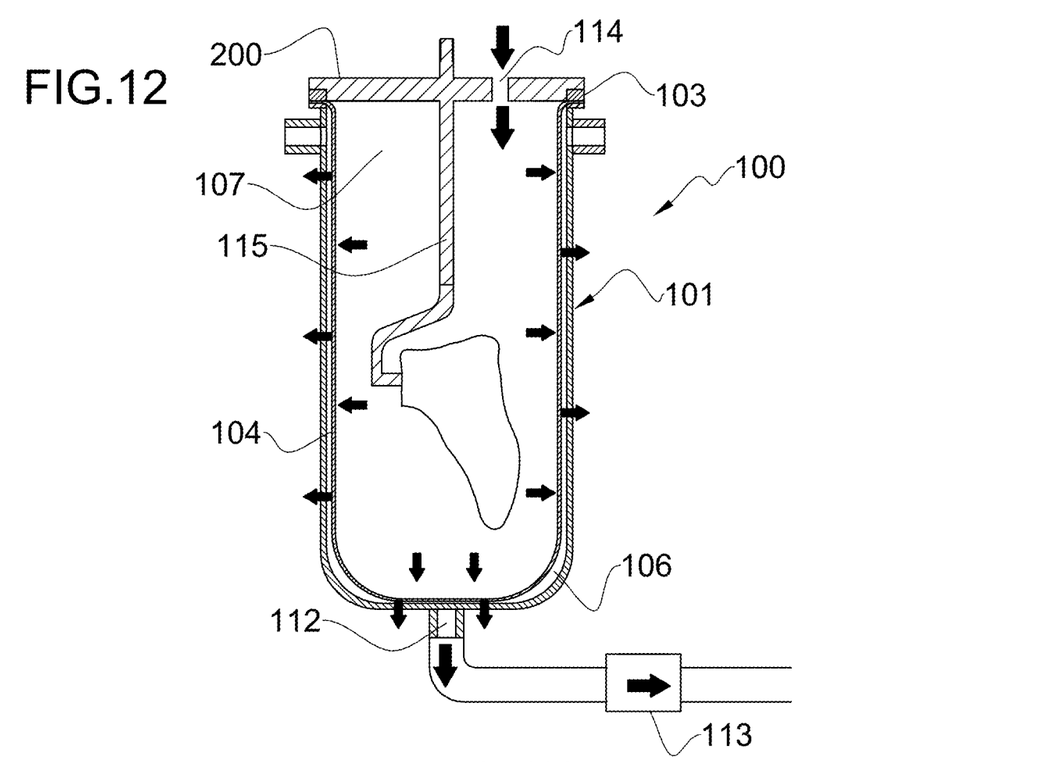

Once the desired cooling is achieved, the bag 104 is detached from the assembly, for example by canceling the pressure difference P3-P4. For this purpose, the inlet 108 and the outlet 110 may be closed and the auxiliary outlet 112 of the rigid casing 101 may be opened, possibly by drawing air contained in the first volume 106 through the suction assembly 113. In addition, it may be contemplated to feed air at a pressure greater than atmospheric pressure through the auxiliary inlet 114 and directly into the bag 104 (FIG. 12).

Figure 13:
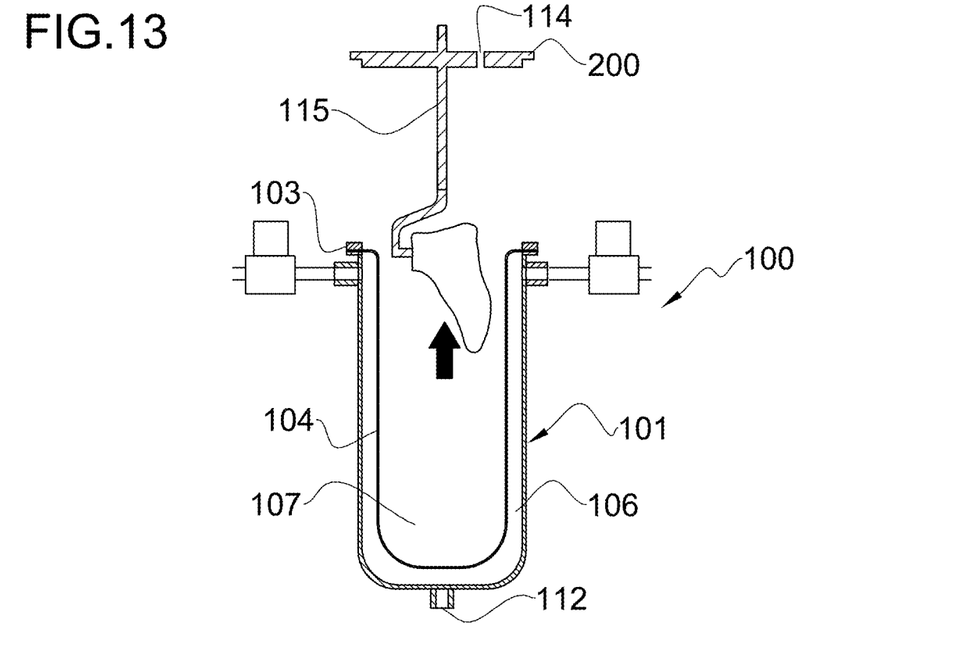

At this point, the assembly is extracted from the device 100 (as schematically represented in FIG. 13) and the operator can remove the stabilized multilayered semi-finished product from the rigid reference shape 9. Finally, the sole 3 and any further finishing elements 20, for example with an aesthetic and/or reinforcing function, are applied to the upper 2.

According to an embodiment variant of the process of the present invention, the outer sock 4 and the inner sock 5 are made separately and operated as separate elements. In such an embodiment variant, both the inner sock 5 and the outer sock 4 have only one open end and the other end is closed. The process involves first fitting the inner sock 5 onto the rigid reference shape 9, then fitting the water impermeable and breathable membrane 6 over the inner sock 5 and finally fitting (without turning it inside out) the outer sock 4 onto the rigid reference shape 9 and over the membrane 6.

In this variant embodiment, at the end of cooling and after extraction from the device 100, in addition to applying the sole 3 and any further finishing elements 20, it is envisaged to finish the edge of the ankle by joining together the neck of the outer sock 4 with that of the inner sock 5, for example by heat-sealing or beading.

The invention claimed is:

1. Process for thermo-adhesive bonding of semi-finished products, comprising:
    preparing at least one inner sock;
    preparing at least one outer sock;
    preparing at least one membrane with a thermo-adhesive placed on an inner surface and/or on an outer surface of said membrane;
    fitting the inner sock on a rigid reference shape;
    fitting the membrane over the rigid reference shape and over the inner sock;
    fitting the outer sock over the rigid reference shape and over the membrane;
    heating the outer sock, the membrane and the inner sock arranged on the rigid reference shape until at least partial melting of the thermo-adhesive is determined; and
    cooling the outer sock, the membrane and the inner sock arranged on the rigid reference shape until cross-linking of the thermo-adhesive and a stable union of the membrane with the outer sock and/or the inner sock is determined;
    wherein, during cooling, it is also provided to exert a substantially uniform pressure on the outer sock, on the membrane and on the inner sock arranged on the rigid reference shape to compact said outer sock, membrane and inner sock.

2. The process of claim 1, wherein exerting the uniform pressure comprises: placing the outer sock, the membrane and the inner sock arranged on the rigid reference shape in a flexible bag and generating a pressure difference between an outside and an inside of the bag so as to compress the bag against the outer sock, the membrane and the inner sock.

3. The process of claim 1, wherein cooling comprises:
    placing the outer sock, the membrane and the inner sock arranged on the rigid reference shape in an auxiliary casing in turn placed in a rigid casing; wherein the auxiliary casing is impermeable to gases; wherein a first volume is delimited between the rigid casing and the auxiliary casing; wherein a second volume is delimited inside the auxiliary casing; and
    introducing a gas at a first pressure through an inlet into the first volume and discharging said gas at a second pressure through an outlet from the first volume, wherein the second pressure is lower than the first pressure, in order to generate an expansion and cooling of the gas contained inside the first volume, cooling the auxiliary casing and the outer sock, the membrane and the inner sock arranged on the rigid reference shape.

4. The process of claim 3, wherein the auxiliary casing is a flexible bag;
    wherein the process comprises: maintaining the first volume at a third pressure equal to the difference between the first pressure and the second pressure; wherein the second volume is at a fourth pressure lower than the third pressure so as to exert said substantially uniform pressure on the outer sock, the membrane and the inner sock arranged on the rigid reference shape.

5. The process of claim 1, wherein heating is performed in an oven.

6. The process of claim 5, wherein heating in the oven the outer sock, the membrane and the inner sock arranged on the rigid reference shape comprises:
    circulating in the oven a heated fluid comprising steam, wherein the heated fluid comes into direct contact at least with the outer sock.

7. The process of claim 1, wherein the inner sock and the outer sock are made as separate elements.

8. The process of claim 1, wherein the inner sock and the outer sock are made as a single, substantially tubular element, wherein the outer sock and the inner sock are joined to each other at an ankle area already before the inner sock is placed on the rigid reference shape.

9. The process of claim 8, wherein fitting the outer sock on the rigid reference shape and above the membrane comprises: turning the outer sock inside out while the inner sock and the membrane are already on the rigid reference shape in order to place said outer sock over said membrane.

10. The process of claim 1, wherein the inner sock and/or the outer sock are knitted.

11. The process of claim 10, wherein the inner sock and/or the outer sock comprise at least one thermoplastic yarn.

12. The process of claim 11, wherein heating and cooling the outer sock, the membrane and the inner sock arranged on the rigid reference shape causes the at least partial melting and subsequent cross-linking of the at least one thermoplastic yarn and a formation of more rigid and less rigid portions of the inner sock and/or the outer sock.

13. The process of claim 1, wherein the membrane is polyurethane, optionally breathable, optionally elastic.

14. The process of claim 1, wherein the membrane is impermeable.

15. The process of claim 1, wherein the thermo-adhesive is placed in dots on the inner surface and/or on the outer surface of said membrane.

16. The process of claim 4, further comprising: closing the inlet and the outlet to maintain said third pressure in the first volume and keeping on pressing the bag against the outer sock, the membrane and the inner sock arranged on the rigid reference shape.

17. The process of claim 6, wherein the heated fluid comprises overheated air, steam, preferably overheated, or a mixture of overheated air and steam, preferably overheated.

* * * * *